(12) United States Patent
Oetjens et al.

(10) Patent No.: US 10,670,515 B2
(45) Date of Patent: Jun. 2, 2020

(54) DETECTING EDGE CRACKS

(71) Applicants: MAGNA INTERNATIONAL INC., Aurora (CA); Thomas James Oetjens, Troy, MI (US); Thomas Lome Chartrand, Clarkston, MI (US); Boris Shulkin, West Bloomfield, MI (US)

(72) Inventors: Thomas James Oetjens, Troy, MI (US); Thomas Lome Chartrand, Clarkston, MI (US); Boris Shulkin, West Bloomfield, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 1072 days.

(21) Appl. No.: 14/892,752

(22) PCT Filed: May 6, 2014

(86) PCT No.: PCT/US2014/038318
§ 371 (c)(1),
(2) Date: Nov. 20, 2015

(87) PCT Pub. No.: WO2014/189777
PCT Pub. Date: Nov. 27, 2014

(65) Prior Publication Data
US 2016/0169791 A1    Jun. 16, 2016

Related U.S. Application Data

(60) Provisional application No. 61/825,143, filed on May 20, 2013.

(51) Int. Cl.
*G01N 19/08*    (2006.01)
*G06F 30/15*    (2020.01)
(Continued)

(52) U.S. Cl.
CPC ............... *G01N 19/08* (2013.01); *G01N 3/08* (2013.01); *G06F 30/15* (2020.01); *G06F 30/20* (2020.01);
(Continued)

(58) Field of Classification Search
CPC ............. G06F 17/5009; G06F 17/5095; G06F 17/5018; G06F 2217/16; G06F 2217/42; G01N 19/08; G01N 3/08
See application file for complete search history.

(56) References Cited

U.S. PATENT DOCUMENTS 5,539,656 A    7/1996  Annigeri
6,267,011 B1   7/2001  Kurtz et al.
(Continued)

FOREIGN PATENT DOCUMENTS

CN    101710040 A    5/2010
EP    0217758 B1    12/1990
EP    1046899 A2    10/2000

OTHER PUBLICATIONS

Filip Lindberg, Sheet metal forming simulations with FEM, Jan. 24, 2012, Department of Physics Master of Science Programme in Engineering Physics Umeå University (Year: 2012).*
(Continued)

*Primary Examiner* — Stephanie E Bloss
(74) *Attorney, Agent, or Firm* — Dickinson Wright PLLC

(57) ABSTRACT

A method and system for detecting edge cracks of an element of a sheet metal product is provided. The method includes calculating a first stress associated with a forming process employing a first die; calculating a second stress associated with a finishing process employing a second die; combining the first stress and the second stress to formulate a total stress; simulating the sheet metal product to produce a benchmark stress; and comparing the total stress and the
(Continued)

benchmark stress to determine if the element predictively contains edge cracks.

12 Claims, 7 Drawing Sheets

(51) Int. Cl.
  G06F 30/20 (2020.01)
  G06F 30/23 (2020.01)
  G01N 3/08 (2006.01)
  G06F 111/10 (2020.01)
  G06F 113/24 (2020.01)

(52) U.S. Cl.
  CPC .......... G06F 30/23 (2020.01); *G06F 2111/10* (2020.01); *G06F 2113/24* (2020.01)

(56) References Cited

U.S. PATENT DOCUMENTS

| | | | |
|---|---|---|---|
| 6,311,135 B1 | 10/2001 | Suresh et al. | |
| 7,165,463 B2 | 1/2007 | Liu et al. | |
| 7,605,921 B2 | 10/2009 | Hietanen et al. | |
| 8,042,405 B2 | 10/2011 | Shuaib et al. | |
| 2002/0017173 A1* | 2/2002 | Li | B23D 15/00 |
| | | | 83/13 |
| 2003/0050765 A1* | 3/2003 | Sasahara | G06F 30/00 |
| | | | 702/155 |
| 2005/0146708 A1 | 7/2005 | Shi et al. | |
| 2007/0225847 A1* | 9/2007 | Pietsch | G05B 19/40938 |
| | | | 700/98 |
| 2007/0251327 A1* | 11/2007 | Broene | G01N 3/32 |
| | | | 73/769 |
| 2011/0192232 A1 | 8/2011 | Kuwayama et al. | |
| 2011/0295570 A1* | 12/2011 | Zhu | G06F 30/23 |
| | | | 703/2 |
| 2013/0314117 A1* | 11/2013 | Gardell | G01R 31/71 |
| | | | 324/755.01 |
| 2014/0019099 A1* | 1/2014 | Zhu | G06F 30/23 |
| | | | 703/2 |
| 2014/0358268 A1* | 12/2014 | Kubli | G05B 19/40937 |
| | | | 700/97 |
| 2015/0082855 A1* | 3/2015 | Fujii | B21D 22/00 |
| | | | 72/379.2 |

OTHER PUBLICATIONS

Lindberg, Filip; Sheet metal forming simulations with FEM; Master's Thesis in Engineering Physics, Department of Physics, Master of Science Programme in Engineering Physics, Umea University, Umea, Sweden; Jan. 24, 2012.
Translation of Notification of First Office Action in co-pending CN appln. No. 201480029466.2, dated Nov. 4, 2016, with attached Search Report.
European Search Report issued in co-pending Appln. No. EP14800412. 0, dated Jul. 29, 2016.
M. H. Chen et al: "Application of the forming limit stress diagram to forming limit prediction for the multi-step forming on auto panels", Journal of Materials Processing Technology, vol. 187-188 (2007), pp. 173-177, XP005939499.
S. Ghosh et al: "3D modeling of shear-slitting process for aluminum alloys", Journal of Materials Processing Technology, vol. 167 (2005), pp. 91-102, XP027806382.

* cited by examiner

DETECTING EDGE CRACKS

CROSS-REFERENCE TO RELATED APPLICATIONS

This U.S. National Stage Patent Application claims the benefit of PCT International Patent Application Serial No. PCT/US2014/038318 filed May 16, 2014 entitled "Detecting Edge Crack," which claims the benefit of U.S. Provisional Patent Application Ser. No. 61/825,143 filed May 20, 2013, entitled "Detecting Edge Cracks," the entire disclosures of the applications being considered part of the disclosure of this application and hereby incorporated by reference.

BACKGROUND

Computer aided design (CAD) allows a designer of a product to simulate the product based on various mathematical parameters. For example, employing CAD to design a product, the designer may be cognizant of various external factors or parameters with the materials incorporated with the product. Computer Aided Engineering (CAE) simulates the CAD model using these factors to subsequently ascertain whether the product will work in a prescribed fashion.

In the production of a metal based product composed of sheet metal, various dies may be employed to create a finished product. The sheet metal dies allow machines to cut, bend and form (i.e. stretch/compress) the sheet metal to ultimately create the finished product. For example, sheet metal may be used to create a side door or panel of an automobile.

The finished product may be created as a result of multiple dies. For example, a piece of sheet metal may be cut as a template. Subsequently, various pieces on the edge of the sheet metal may be cut to pattern and form the finished product to a desired shape.

In using sheet metal for a specific application, such as a side or door of an automobile, various aspects of the finished product may be desired. For example, there may be a demand for a thin and light-weight door of an automobile. However, if the door is fabricated to be too thin, the door becomes susceptible to cracking or breaking. Further, in various automobile standards, a requirement has been mandated that dictates that various metal surfaces bend on contact, instead of crack. Thus, if the sheet metal used for the metal surface of an automobile is too thin, the metal surface of the automobile may crack on contact.

SUMMARY

A method and system for detecting edge cracks of an element of a sheet metal product is provided. The method includes calculating a first stress associated with a forming process employing a first die; calculating a second stress associated with a finishing process employing a second die; combining the first stress and the second stress to formulate a total stress; simulating the sheet metal product to produce a benchmark stress; and comparing the total stress and the benchmark stress to determine if the element predictively contains edge cracks.

DESCRIPTION OF THE DRAWINGS

The detailed description refers to the following drawings, in which like numerals refer to like items, and in which.

DETAILED DESCRIPTION

Finished products employing sheet metal are created through various fabrication techniques. One such technique is the use of dies to manipulate the sheet metal to result in different shapes and sizes. The sheet metal die allows a sheet metal stamp to apply pressure on the sheet metal to cut, bend, stretch and manipulate the sheet metal.

Prior to producing the finished product, a CAE program may be employed to simulate various aspects of the finished product. Thus, a designer of the finished product may emulate the finished product via the CAE program. The finished product, and the materials used to create the finished product (such as sheet metal) may be represented via mathematical and numerical parameters. For example, the size, composite materials and density may be attributed to the various materials used to create the finished product.

Thus, using the CAE program, various situations may be predictively analyzed with the finished product. For example, if the finished product is made of sheet metal, the CAE program may be able simulate whether the sheet metal bends or cracks when sourced from sheet metal of a specific thickness.

However, because the predictive analysis made by the CAE program is based on a model, several factors associated with the production and properties of the sheet metal may be omitted. Thus, the predicted thinness may not be wholly accurate. Further, edge cracking may occur because a CAE program may omit issues that lead to edge cracking.

Disclosed herein are systems and methods for detecting edge cracking. The systems and methods disclosed herein employ predictive models associated with each of a plurality of dies, and amalgamate the predictive models via techniques disclosed herein. Thus, by predictively analyzing the finished product with a factor per die used to fabricate the finished product, edge cracking associated with sheet metal that constitutes the finished product may effectively be lessened.

Figure 1:
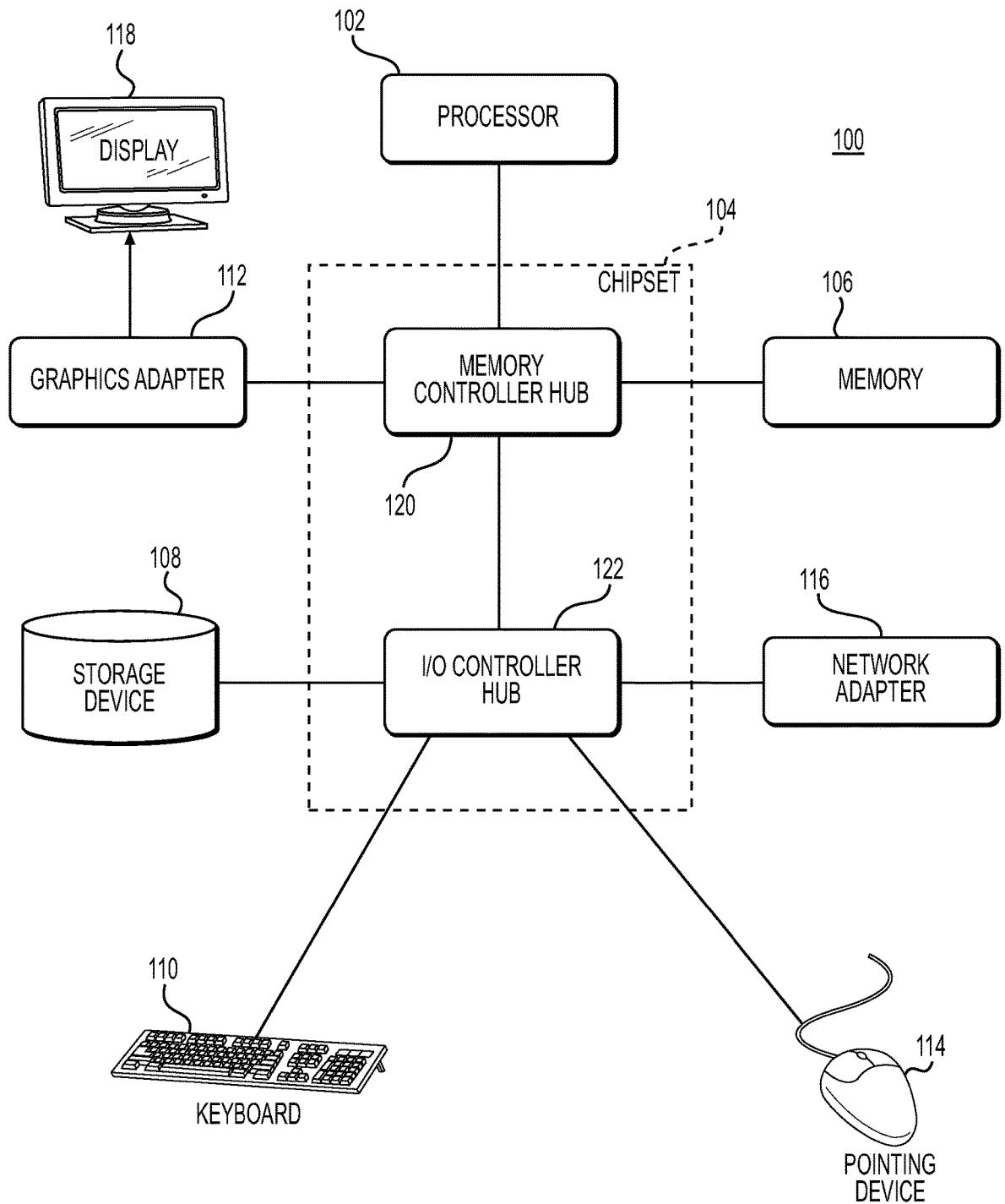
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid-state memory or storage device, might be stored in a distributed database system comprising multiple blade servers working together to provide the functionality described herein. The computers can lack some of the components described above, such as keyboards 110, graphics adapters 112, and displays 118.

Figure 2A:
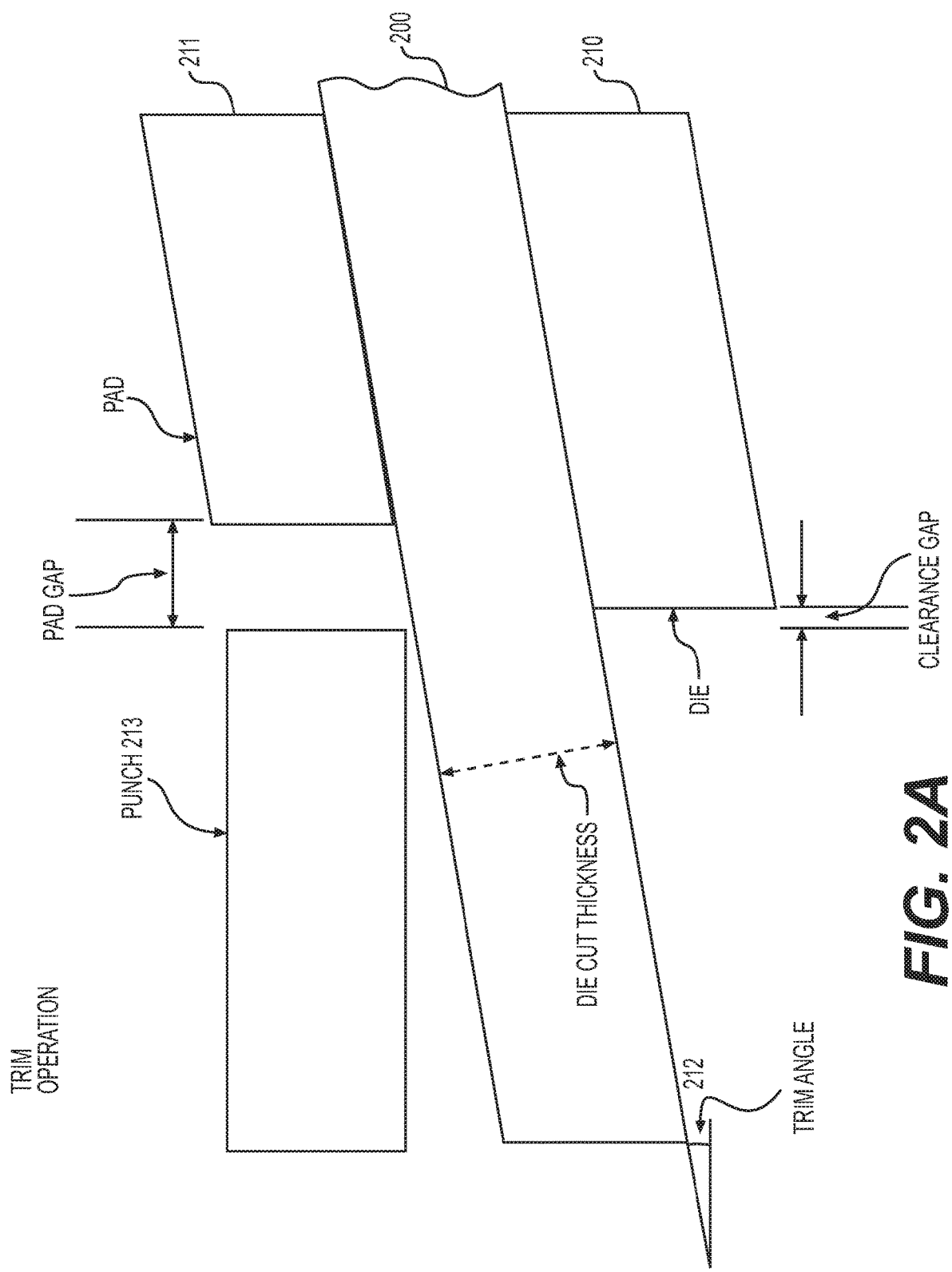
FIGS. 2(a), 2(b), and 2(c) illustrate an example of a fabrication of a finished product.
Figure 2B:
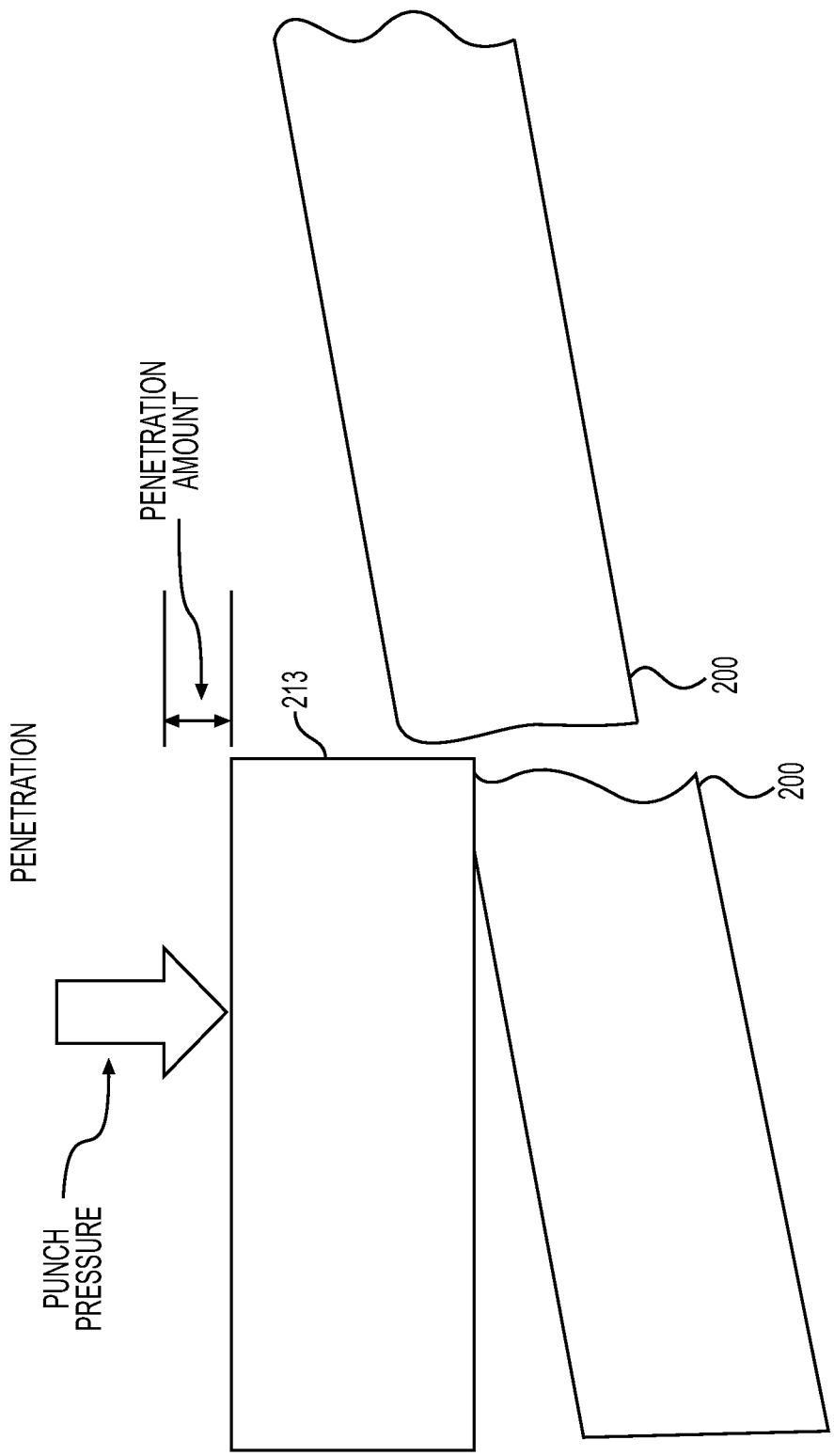
Figure 2C:
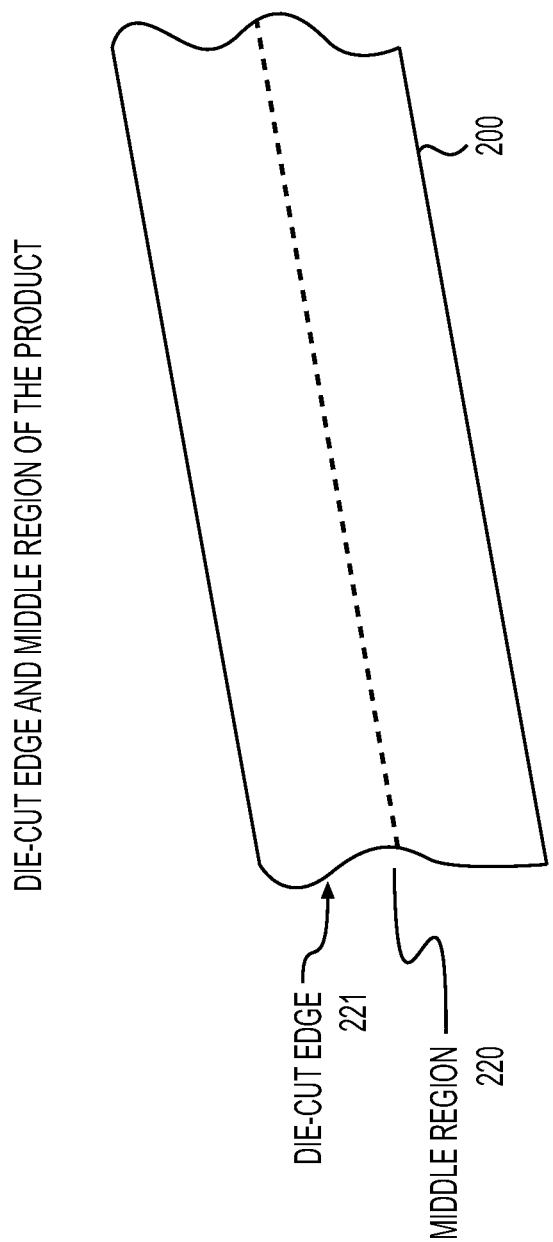

FIGS. 2(a), 2(b), and 2(c) illustrate an example of a fabrication of a finished product. In FIGS. 2(a), 2(b), and 2(c), a sheet metal 200 is manipulated with the use of a die 210. The sheet metal 200 is cut at an angle with die 210, thereby leading to an angled edge, which is shown in FIG. 2(c).

Referring to FIG. 2(a), a trimming operation of the fabrication is shown. The sheet metal 200 is placed on the die 210. A pad 211 is placed on an opposing surface of the sheet metal 200 to the surface in contact with the die 210. The sheet metal 200, the die 210, and the pad 211 are angled at a trim angle 212. The trim angle 212 may be set based on a specific trim orientation desired for an edge of the sheet metal. A punch 213 is provided. In response to pressure being applied to the punch 213, an operation of cutting the sheet metal 200 is performed.

Referring to FIG. 2(b), an example of employing punch 213 is shown. An amount of pressure is placed on the punch 213, which is then transferred onto the sheet metal 200. The result is that the sheet metal 200 is cut and trimmed to form the finished product.

Referring to FIG. 2(c), the sheet metal 200 in a die-cut form is shown. The resultant sheet metal 200 has a middle region 220 and a die cut edge 221.

FIGS. 2(a)-(c) illustrate an example of employing a die to cut and trim sheet metal 200 to result into a finished product. The various parameters discussed in FIGS. 2(a)-(c), such as, the trim angle 212, the die 210, the amount of pressure for punch 213 may be employed in a CAE program to simulate and predictively analyze various phenomena associated with the fabrication of a finished product using sheet metal.

Figure 3:
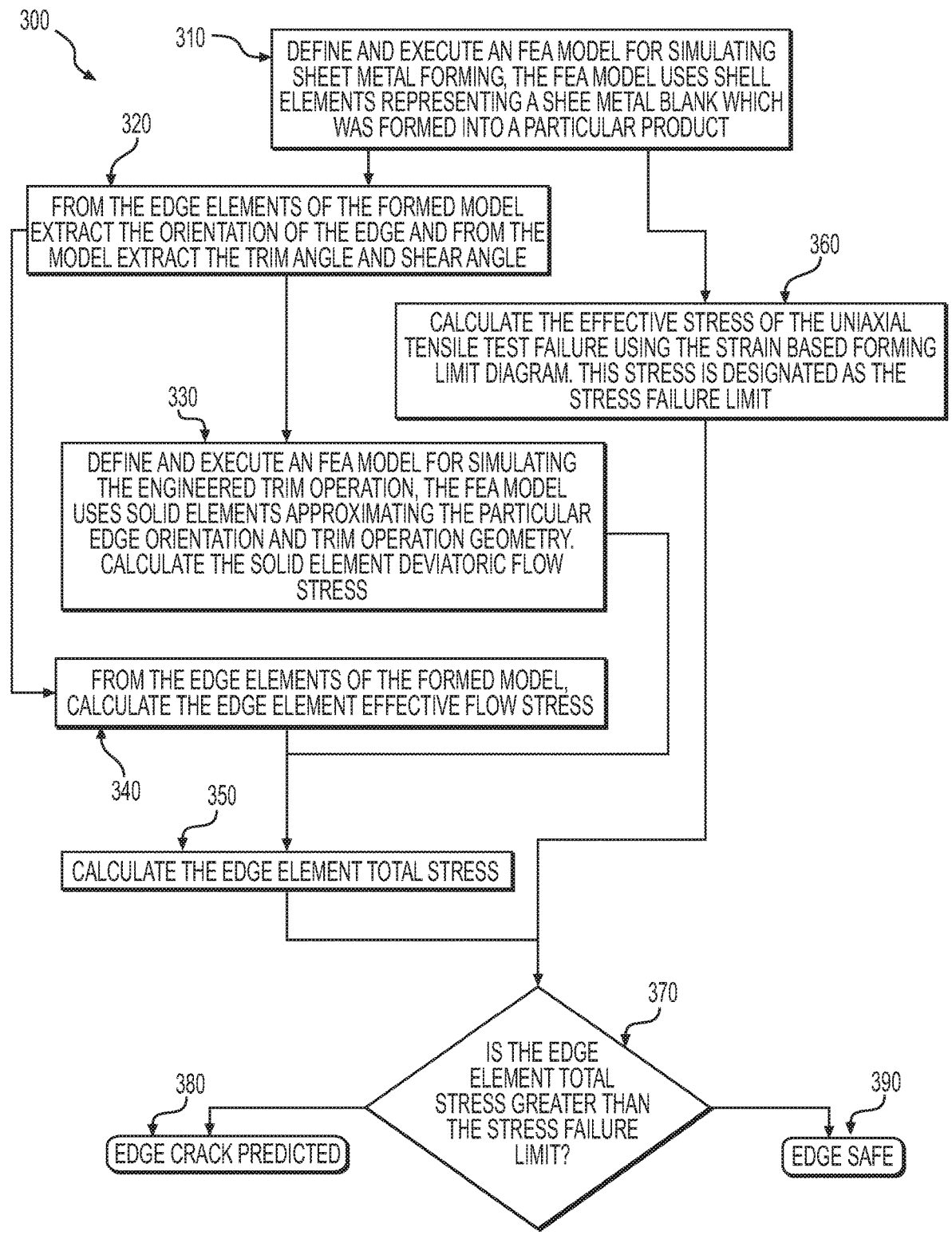
FIG. 3 illustrates an example of a method for detecting edge cracks.

FIG. 3 illustrates an example of a method 300 for detecting edge cracks. The method 300 may be implemented on a system or a device, such as computer 100 described above. In method 300, after each operation, the data produced may be stored in a database, such as storage device 108.

In operation 310, a formability shell element simulation is performed on a first die used to produce the finished product. The first die used may be associated with various parameters. The various parameters, based on the manipulation associated with the first die, in operation 310 may be employed to determine stress and other forces applied to the finished product by the first die. At this juncture, a first-level approximation of the stresses associated with the finished product may be ascertained.

In operation 320, the sheet metal formed using the first die, is demarcated into various edge elements. Each edge element may be created employing a second die. Thus, each edge element may have particular parameters, such as a trim angle and shear angle associated with the edge element's formation.

In operation 330, after each edge element's parameters have been ascertained, a CAE is performed on the edge elements. Because a second die may be used to perform the trimming of the edges, the CAE analysis may refer to a database that categorizes the stresses introduced by the employment of the second die with the particular sheet metal, trim angle and shear angle.

Based on the CAE analysis performed, a solid element deviatoric flow stress (SEDFS) may be calculated for each edge element. The relationship is defined as the following:

$$\delta\_SEDFS = \sqrt{(3/2)}\delta' \rightarrow \text{(a negative value)}$$

wherein:
δ_SEDFS is the solid element deviatoric flow stress; and
δ' is the deviatoric stress at an intersection of a mid-surface and the die-cut edge after the sheet metal is cut with the first die.

In operation 340, the extracted edge elements derived in operation 320 undergo an edge stress analysis to determine an edge element effective flow stress (EFFFS). Essentially, secondary dies used after the first die are modeled to determine an estimated strain placed on the sheet metal. The relationship is defined as the following:

$$\delta\_EFFFS = f(\varepsilon\_EdgeElement)$$

wherein:
δ_EFFFS is edge element effective flow stress;
ε_EdgeElement is the true principle major, minor and thinning strains of an edge element (as derived from models for secondary dies used after the first die); and
f( ) is a function that translates the strain value to a stress value.

In operation 350, the edge element total stress (EETS) is calculated. This relationship is defined as:

$$\delta\_EETS = \delta\_EFFFS - \delta\_SEDFS$$

wherein:
δ_EETS is edge element effective flow stress.

In a parallel branch of method 300 after operation 310 (operation 360), the effective stress for a failure associated with the uniaxial tensile test applied to the finished product is calculated. In order to calculate the effective stress, a strain based forming limit diagram may be employed. This process is described further in the detailed explanation for FIG. 4.

In operation 370, the δ_EETS calculated in operation 360 is compared against the value calculated in operation 360. Operation 370 may be performed recursively for each edge element extracted in operation 320. If the δ_EETS is greater than the value calculated in operation 320, the method 300 proceeds to operation 380. Conversely, if the δ_EETS is less than the value calculated in operation 320, the method 300 proceeds to operation 390.

In operation 380, an indication is made that an edge crack is predicted. Conversely, in operation 390, an indication is made that the edges of the finished product are safe.

Figure 4:
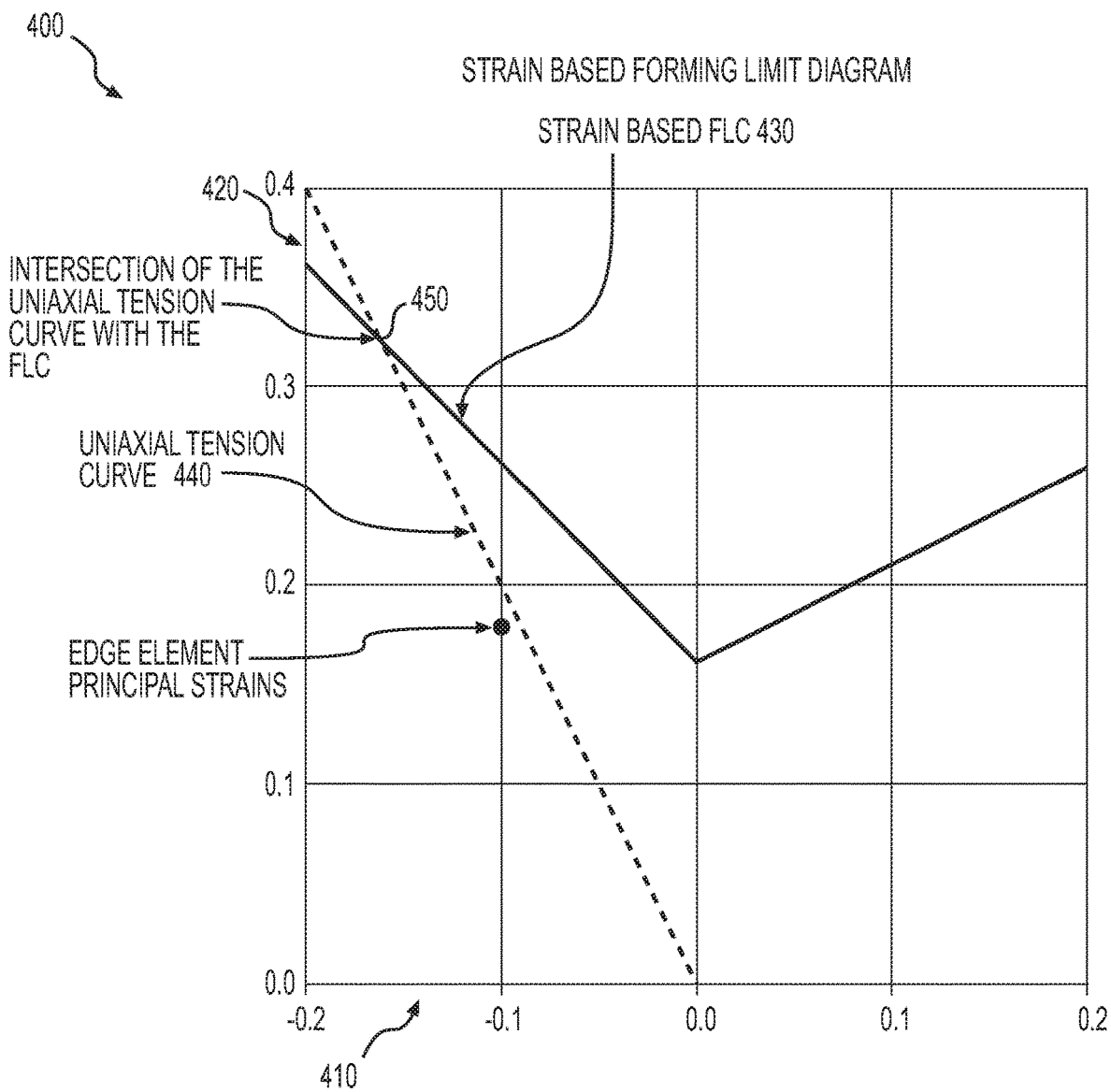
FIG. 4 illustrates a graph depicting a strain based forming limit diagram.

FIG. 4 illustrates a graph 400 depicting a strain based forming limit diagram. The graph 400 may be employed to ascertain the effective stress of operation 360 (of method 300). The graph 400 is created for the sheet metal employed to create the finished product analyzed in method 300.

The x-axis 410 of graph 400 represents the minor strain, and the y-axis 420 represents the major strain. The y-axis 420 represents the stretching and compressing strains associated with one direction, and the x-axis 420 represents the resultant strain in another direction.

The graph 400 has two curves, the strain based forming limit curve (FLC) 430 and the uniaxial tension curve 440. The uniaxial tension curve 440 represents a tensile test associated with a specific finished product. The tensile test may be simulated or calculated via the CAE program. The strain based FLC 430 represents a curve denoting the maximum strains associated with a particular sheet metal.

From the curves plotted on graph 400, an intersection point 450 indicates a calculated maximum strain associated with the finished product. Using a conversion from strain to stress, the stress may be calculated as well. This stress value may be employed as the effective stress used in operation 360.

Figure 5:
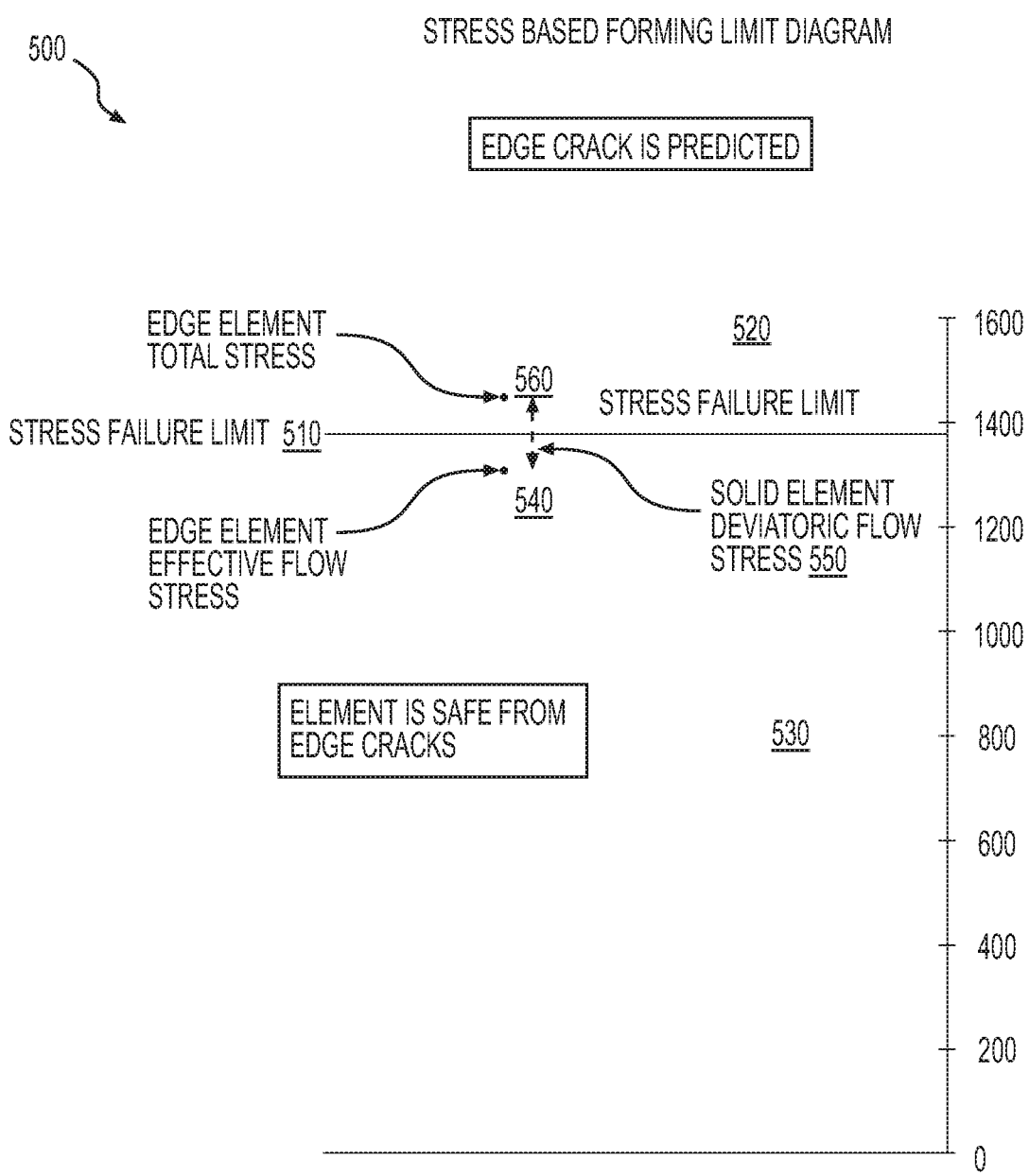
FIG. 5 illustrates a graphical example of method described in FIG. 3 as applied to a sample edge element of a finished product employing sheet metal.

FIG. 5 illustrates a graphical example of method 300 (graph 500) as applied to a sample edge element of a finished product including sheet metal. In FIG. 5, a stress failure limit 510 (as calculated in operation 360) is shown. In the example shown, the stress failure limit 510 is approximately 1400 megapascals (or any unit of measure used to measure stress). In the region 520 above the limit 510, an edge crack is predicted. In the region 530 below the limit 510, the element in question is safe from edge cracks.

In the example shown, the element has an $\delta\_EFFFS$ 540 below the limit 510. However, when coupled with an $\delta\_SEDFS$ 550 associated with the element, the resultant $\delta\_EETS$ 560 is above the limit 510. Thus, in the example shown in FIG. 5, the element in question may be predictively analyzed as resulting in an edge crack.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A method, performed on a processor, for detecting edge cracks of an element of a sheet metal product, comprising:
   determining one or more edge elements for a first die, wherein the one or more edge elements includes a trim angle parameter and a shear angle parameter;
   calculating, using the one or more edge elements for the first die, a first stress associated with a forming process employing the first die;
   calculating a second stress associated with a finishing process employing a second die, wherein the second stress is defined as a function of true principle major, minor, and thinning strains of an edge element as derived for the second die;
   combining the first stress and the second stress to formulate a total stress;
   simulating the sheet metal product to produce a benchmark stress; and
   comparing the total stress and the benchmark stress to determine if the element predictively contains edge cracks.

2. The method according to claim 1, wherein the first die is employed to cut the sheet metal product.

3. The method according to claim 2, wherein the second die is employed to trim the sheet metal product.

4. The method according to claim 3, wherein calculating the second stress further comprises:
   determining the trim angle associated with the second die;
   calculating a strain associated with the trim angle and the second die; and
   converting the strain into the second stress.

5. The method according to claim 1, wherein the benchmark stress is obtained by performing a uniaxial test on the sheet metal product.

6. The method according to claim 1, wherein the method is integrated into a computer aided engineering (CAE) program.

7. A method performed on a processor for detecting a crack on a sheet metal via a computer aided simulation, comprising:
   performing a formability shell element simulation on a first die to estimate a first manipulation to the sheet metal, the first die being applied to the sheet metal;
   demarcating the estimated first manipulation into a plurality of edge elements;
   performing a computer aided estimation analysis on each of the plurality of edge elements based on a second die, the second die being applied to the sheet metal, to determine a solid element deviatoric flow stress (SEDFS) for each of the plurality of edge elements wherein each of the plurality of edge elements includes a trim angle parameter and a shear angle parameter;
   performing an edge stress analysis to determine the edge element effective flow stress (EFFFS), wherein the EFFFS is defined as a function of true principle major, minor, and thinning strains of an edge element corresponding to the second die;
   calculating an edge element total stress (EETS) from the EFFFS and the SEDFS for each of the plurality of edge elements;
   calculating an effective stress based on a strain based forming limit diagram for the sheet metal; and
   comparing the EETS with the effective stress,
   wherein at least one of the steps above is performed on a processor.

8. The method according to claim 7, wherein the comparison further comprises, in response to the EETS being larger than the effective stress, indicating an edge crack of the sheet metal.

9. The method according to claim 7, the comparison further comprising, in response to the EETS being smaller than the effective stress, indicating that a transformation of the sheet metal associated with the first and second die is safe.

10. The method according to claim 7, wherein the EFFFS is defined for each of the plurality of edge elements by a major, minor and thinning strain parameter as calculated from the second die applied after the first die.

11. The method according to claim 10, wherein a characterization of the first die and the second die is stored in a database.

12. The method according to claim 7, wherein the calculating of the effective stress further comprises:
   deriving a uniaxial tension curve for the sheet metal based on the first die and the second die; and
   comparing the uniaxial tension curve with the strain based forming limit diagram to derive the effective stress.

* * * * *

UNITED STATES PATENT AND TRADEMARK OFFICE
CERTIFICATE OF CORRECTION

PATENT NO. : 10,670,515 B2
APPLICATION NO. : 14/892752
DATED : June 2, 2020
INVENTOR(S) : Thomas James Oetjens, Thomas Lome Chartrand and Boris Shulkin It is certified that error appears in the above-identified patent and that said Letters Patent is hereby corrected as shown below:

On the Title Page

Item [22], should read as follows:
-- PCT Filed: May 16, 2014 --

Signed and Sealed this
Twenty-first Day of July, 2020

Andrei Iancu
*Director of the United States Patent and Trademark Office*